United States Patent [19]

Stearns

[11] Patent Number: 5,507,946
[45] Date of Patent: Apr. 16, 1996

[54] APPARATUS FOR WASTEWATER TREATMENT

[75] Inventor: Donald M. Stearns, Cocoa, Fla.

[73] Assignee: PEC Research, Inc., Sharpes, Fla.

[21] Appl. No.: 587,043

[22] Filed: Sep. 24, 1990

Related U.S. Application Data

[62] Division of Ser. No. 301,463, Jan. 26, 1989, Pat. No. 4,976,863.

[51] Int. Cl.$^6$ ........................................... C02F 3/30
[52] U.S. Cl. ........................... 210/202; 210/221.2
[58] Field of Search ............................ 210/608, 703, 210/704, 769, 96.1, 202, 205, 218, 220, 221.2

[56] References Cited

U.S. PATENT DOCUMENTS

| | | | |
|---|---|---|---|
| 3,622,508 | 11/1971 | Komline | 210/608 |
| 3,803,806 | 4/1974 | Komline, Sr. | 210/769 |
| 4,094,783 | 6/1978 | Jackson | 210/703 |
| 4,168,228 | 9/1979 | Mallatt et al. | 210/703 |

*Primary Examiner*—Thomas Wyse
*Attorney, Agent, or Firm*—Antonelli, Terry, Stout & Kraus

[57] ABSTRACT

A process for treating wastewater containing insoluble solid waste material and soluble solid waste material including the following series of steps: (1) controlling the oxygen content of the wastewater to a level at which growth of anaerobic bacteria is substantially eliminated, (2) separating the insoluble solid waste material from the wastewater, (3) treating the soluble solid material in the wastewater with a predetermined amount of aerobic bacteria, and (4) reducing the amount of aerobic bacteria in the wastewater. The insoluble solid waste material separated from the wastewater can be burned to produce electrical energy. Apparatus for carrying out the process are also disclosed.

9 Claims, 5 Drawing Sheets

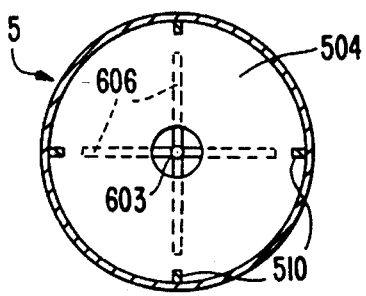
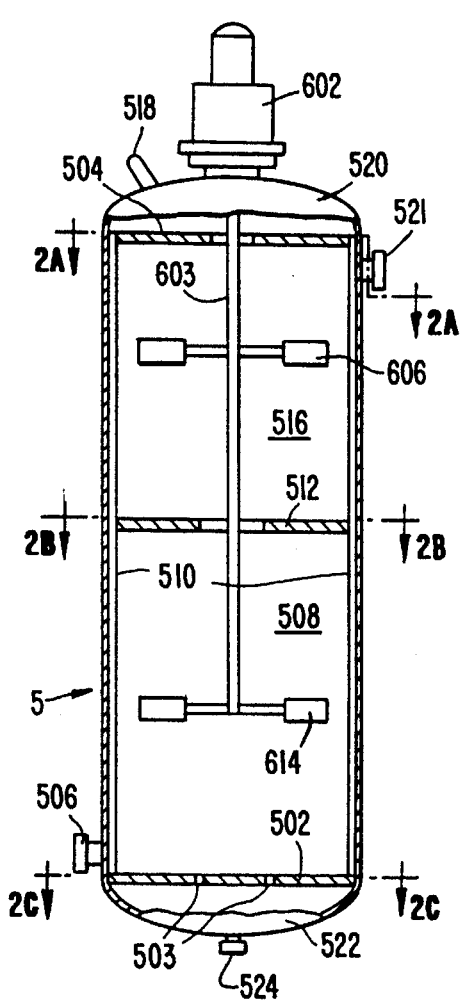
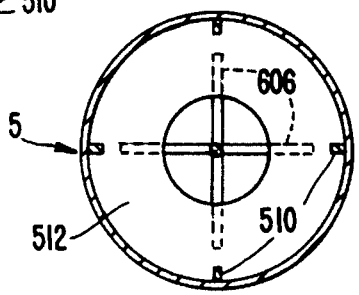
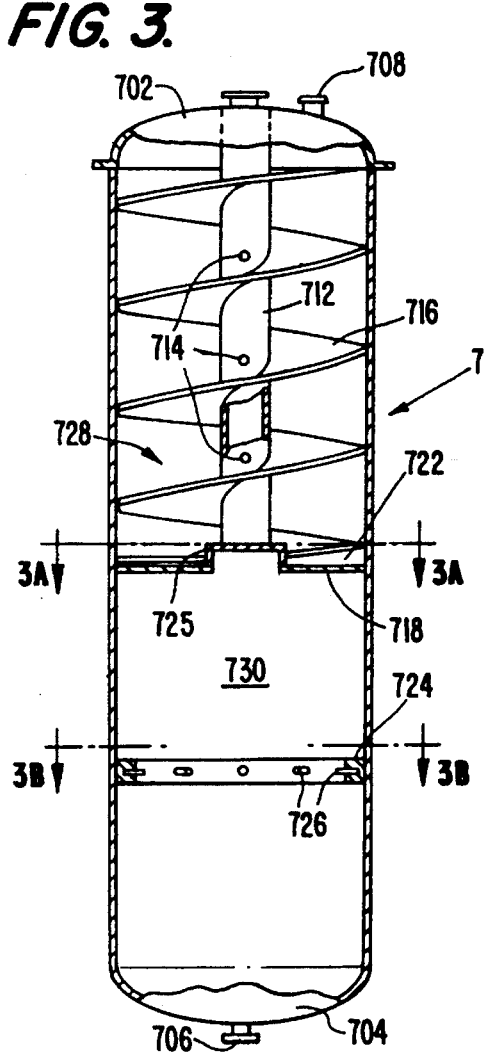
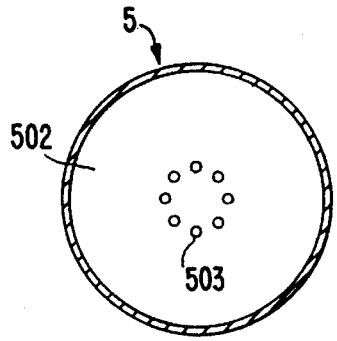

APPARATUS FOR WASTEWATER TREATMENT

This is a division of application Ser. No. 07/301,463, filed Jan. 26, 1989, now U.S. Pat. No. 4,976,863.

BACKGROUND OF THE INVENTION

For the entire history of the treatment of waste products produced by the bodies of animals or mankind, a naturally occurring process has been the basis for the treatment of carbon-based and other compounds that make up the body waste. The presence of several types of bacteria which are included in the waste body products from all animals and mankind have provided the means of treatment by either of two biological processes. One class of naturally occurring bacteria utilizes any dissolved oxygen in the water phase of the waste to oxidize the waste products with the resulting production of water, carbon dioxide and other oxide products. If the waste liquid phase does not contain dissolved oxygen, the second class of naturally occurring bacteria is able to act on the carbon-based and other compounds with the resulting production of hydrogen sulfide, methane and other complex organic compounds.

The general classification for the bacteria that require dissolved oxygen in the liquid phase of the waste-water for growth is aerobic bacteria. Due to the very low solubility of oxygen in water, air must be in contact with the wastewater on a frequent cycle basis in order to resupply the dissolved oxygen in the wastewater. The second naturally occurring general class of bacteria is anaerobic bacteria which is based on the requirement that there cannot be any amount of dissolved oxygen in the wastewater for its growth to occur.

As the by-products produced by the aerobic bacteria growth in wastewater do not present a danger or provide an unacceptable secondary problem to mankind, it has in almost all cases become the primary process for wastewater treatment. The planned use of the second naturally available bacteria, anaerobic, has been confined to situations that lend themselves to the use of closed tanks or underground containers. The by-products produced by the action of the anaerobic bacteria result in major problems in the area of explosion hazard, corrosion problems, offensive odor and toxic reaction to mankind. The past and current processes for the treatment of wastewater are based on the use of the naturally occurring bacteria in either the aerobic bacterial cycle or the anaerobic bacterial cycle with the design of the treatment system being controlled by the ability to provide the most efficient environment for either type of bacterial growth. This design factor has to also have as a major consideration the disposal of the by-products of the bacterial action.

The treatment of wastewater does not begin at the treatment plant and this factor has become a major problem as the size of collection and transmission systems have been increased to minimize the number of treatment plants required. The action of the naturally occurring bacteria begins at the point of introduction of the body waste products into a water carrier. The growth of the aerobic bacteria is normally the first action as most wastewater liquid phases will contain some amount of dissolved oxygen. If the dissolved oxygen level is not maintained at some positive value, the growth of the aerobic bacteria will stop and be replaced by the growth of dormant anaerobic bacteria. The action of the aerobic bacteria is a self-limiting factor based on the availability of dissolved oxygen in the liquid phase. The lower the concentration of dissolved oxygen in the liquid phase, the slower the growth rate of the aerobic bacteria. Increases in the retention time in the collection and transmission systems associated with the treatment plant affects the condition of the wastewater received and the treatment process used. Without the wastewater being exposed to air contact, the loss of dissolved oxygen concentration can result in wastewater being received at the treatment plant in a condition that can adversely affect the normally used aerobic process.

Since a means for effectively controlling dissolved oxygen levels to a sufficient level in the collection and transmission systems was not previously available, the final treatment process was limited to the continuation of the process provided by natural occurrence. Only the selection of the type of aerobic or anaerobic process to continue the biological treatment could be utilized in wastewater treatment plants.

Three types of aerobic biological treatment processes are the most commonly found in wastewater treatment plants: the extended aeration process, the contact stabilization process and the complete mix process. All three processes utilize aeration devices to increase the dissolved oxygen concentration of the liquid phase of the wastewater and the return of wastewater solids with high concentrations of bacteria growth. The main differences between the three processes is the amount of retention time of the wastewater in the aeration zones of the treatment process, the amount of return of wastewater solids with high bacterial growth and the amount of wastewater solids that remain to be disposed of after the aeration process. The problem of disposal of the excess wastewater solids or sludge resulting from any of the three biological treatment processes has become a major threat to not only mankind, but also to the entire planet by destruction of the water supply necessary for both animal and human life. The amount of sludge generated by the three different biological processes is generally in the same ratio as the amount of retention time utilized in the aeration zones of the treatment process. For all three of the processes used, secondary treatment of sludge by either aerobic or anaerobic bacterial action is required. The greater the amounts of sludge developed by the short retention times in the aeration zones of the treatment process, the greater the production of hazardous sludge that will require secondary treatment and controlled disposal.

The development of the centrifugal oxygenator described in U.S. patent application Ser. No. 07/109,192 filed Oct. 16, 1987 (which is a continuation of U.S. patent application Ser. No. 06/799,104 filed Nov. 18, 1985, now abandoned) and pending PCT application PCT/US86/02542, the contents of each of which are incorporated herein by reference, now provides the means to control the dissolved oxygen levels in wastewater collection and transmission systems which, in turn, allows the control of the naturally occurring bacterial growth. The centrifugal oxygenator has proven by certified testing that it has the ability to provide oxygen transfer rates of 40% in liquid levels of only two feet to as high as 98% at liquid levels of over twenty feet. Unlike prior aeration devices, the centrifugal oxygenator provides complete control of the air or gas flow rate from 0% to the maximum capacity of the unit size. The centrifugal oxygenator can operate on a stop/start basis without any clogging of the air or gas flow passages and also provides a high velocity directionalized mixing and solid suspension hydraulic flow from the unit.

SUMMARY OF THE INVENTION

The present invention provides a process for treating wastewater containing insoluble solid waste material and soluble solid waste material comprising the following series of steps: controlling the oxygen content of the wastewater to a level at which growth of anaerobic bacteria is substantially eliminated, separating the insoluble solid waste material from the wastewater, treating the soluble solid material in the wastewater with a predetermined amount of aerobic bacteria and reducing the amount of aerobic bacteria in the wastewater, and also provides an apparatus for its practice.

The present invention combines the purification of wastewater with the disposal of waste paper materials for the generation of electrical power. The process does not rely on either aerobic or anaerobic bacteria for chemical modification of the non-soluble wastewater solids. Biological treatment is confined to the soluble material in the wastewater. The process utilizes control of dissolved oxygen levels in the wastewater collection, transmission and treatment system in place of the currently applied uncontrollable addition of air or other oxidizing chemicals. Previous means for addition of air to wastewater were limited in their ability to operate under the conditions of start/stop or variable gas rate requirements needed for the control of dissolved oxygen levels. The use of centrifugal oxygenators provides the means of control of the dissolved oxygen in wetwells, pipelines and throughout the wastewater treatment plant, thus providing the means for control or elimination of the growth of anaerobic bacteria and minimizing the growth of aerobic bacteria. With the placement of centrifugal oxygenators in gravity collection manholes and pump station wetwells of adequate size to provide sufficient retention time for oxygen transfer, and as sidestream circulators in force main transmission pipelines using pure oxygen gas feed to the centrifugal oxygenator, control of dissolved oxygen levels is possible with the result that the control of both anaerobic and aerobic bacterial development is now possible.

The efficiency of both physical separation of the wastewater solids and the recovery of the energy value of the solids are a function of the elimination of the growth of anaerobic bacteria in the collection and transmission systems and the minimizing of the growth of aerobic bacteria by the maintenance of minimum levels of dissolved oxygen in the collection and transmission portions of wastewater systems. Wastewater transmission systems can now be designed on either a constant rate or constant pressure basis using the control of dissolved oxygen in storage type wetwells in primary and repump stations and pipeline injection of pure oxygen. Either of these designs will greatly reduce the storage requirement at the treatment plant necessary for the constant rate operation of the plant process.

With the means for controlling the dissolved oxygen levels, which in turn minimizes the bacterial growth, and the additional means of providing the constant flow rates in the wastewater treatment process, two additional problems must be solved to provide high efficiency separation by air flotation. The control of the raise rate of the air bubble must be maintained as close as possible to the physical limitations imposed by the difference in specific gravity of the gas and liquid phases. This is accomplished by dispersion of the gas phase into very small size gas particles and the use of positive gas pressure above the surface of the liquid phase. To further increase the separation efficiency, fibrous material is contacted with the wastewater solids prior to introduction into the pressurized separation column. The low density fibrous material attachment to the wastewater solids provides assistance in the flotation separation in two ways. The primary assistance is the high degree of attachment of the air bubble to the irregular surface of the fiber, and the second is the decrease in the density of the wastewater solid by its attachment to the low density fiber. These actions greatly increase the separation efficiency of the flotation process.

The primary step for the separation of the wastewater solids from its liquid carrier is a two-stage pressurized air flotation system using the addition of a fiber slurry prepared from waste paper material to increase the physical separation efficiency of the flotation process. The second step applies batch/continuous aerobic biological action for the treatment of soluble matter. The third step uses high liquid level, high efficiency solids removal settling to remove solids not removed in the primary step. The final step in the wastewater treatment process applies contact columns with coal and paper fiber media for solids removal and bacterial reduction. The soluble material in the wastewater is treated by controlled aerobic biological action in batch/continuous variable operating level aeration tanks with the controlled addition of return activated sludge which has a known concentration of dissolved oxygen and a known concentration of aerobic bacteria. The level of dissolved oxygen in the batch/continuous aeration tanks can be controlled at minimum required levels for the treatment of the soluble material in order to minimize the amount of bacterial growth on the wastewater solids not removed by the pressurized air separation phase of the treatment process. The high efficiency settling tanks (clarifiers) obtain their increased efficiency as compared with current designs by a substantial increase in the liquid level which is allowable by the removal of most of the wastewater solids in the primary stage, the control of bacterial concentrations and the control of the dissolved oxygen levels in the feed to the settling tanks. The contact columns act as a final removal stage for all wastewater solids and also the reduction in bacteria in the effluent of the treatment process using pre-contact column chlorination. The contact columns contain single use (one operating cycle) mixed media of coal particles and paper fiber. In addition to the mixed media, a high concentration of chlorine or similar-acting chemical is maintained in the contact columns for high efficiency bacteria reduction.

The wastewater solids are combined with the coal and paper fiber materials and thereafter used as a fuel for the energy recovery power generation section of the treatment plant. The process utilizes an internal reuse effluent system to supply cooling water to the condenser of the power plant system and other needs in the process for media preparation, transfer and energy recovery. An internal reuse storage and chlorine contact tank equipped with a centrifugal oxygenator is used to remove any excess chlorine from the reuse effluent by air stripping using the fine bubble dispersion and increased oxygen levels which can be provided by the centrifugal oxygenator. After internal reuse, the effluent is treated for any needed adjustment in the dissolved oxygen concentration by use of centrifugal oxygenators with enriched or pure oxygen supplied in either a liquid or gas phase from bulk storage tanks or cylinders. All wastewater solids that are removed and the fiber material and coal added for the operation of the process of the present invention are mixed with the additional coal and shredded paper waste and used as fuel for the power generating system incorporated in the process design, thus completely eliminating the need for disposal or additional treatment of the partially treated wastewater solids, thus producing a sludge-free process.

The process reduces the requirement for the return of activated sludge by an average factor of ten, thus greatly reducing the internal flow requirement of the treatment plant. The internal flow is also reduced by the elimination of the recycle wash water needed for many type of filters used for final effluent quality control. The process provides a superior effluent quality by the use of a non-backwash single use (one operating cycle) high efficiency dual mixed media of solids and fiber in the contact columns for solids removal and bacterial reduction in place of tertiary filters or similar types of solids removal devices that require backwash water for removal of the trapped solids. The use of a constant pressure and/or a constant rate design system in the collection and transmission sections of the wastewater system can provide an effective and low-cost reduction in the wastewater storage requirement and the treatment needed for the operation at a constant rate. In order to provide control of dissolved oxygen levels in the collection and transmission systems, pump station wetwells must be increased in size as compared to current design practice. By increasing the pump station wetwell size above that needed for dissolved oxygen control, storage capacity for either the constant pressure or constant rate transmission system can be obtained at very small increases in initial cost.

BRIEF DESCRIPTION OF THE DRAWINGS

FIG. 2 is a side elevational view, partially in section, of an air dispersion column which may be used in the present invention.

FIGS. 2A, 2B and 2C are top cross-sectional views of the air dispersion column of FIG. 2 along lines 2A—2A, 2B—2B and 2C—2C, respectively.

FIG. 3 is a side elevational view, partially in section, of a pressurized air separation column which may be used in the present invention.

DETAILED DESCRIPTION OF THE PREFERRED EMBODIMENTS

Figure 1:
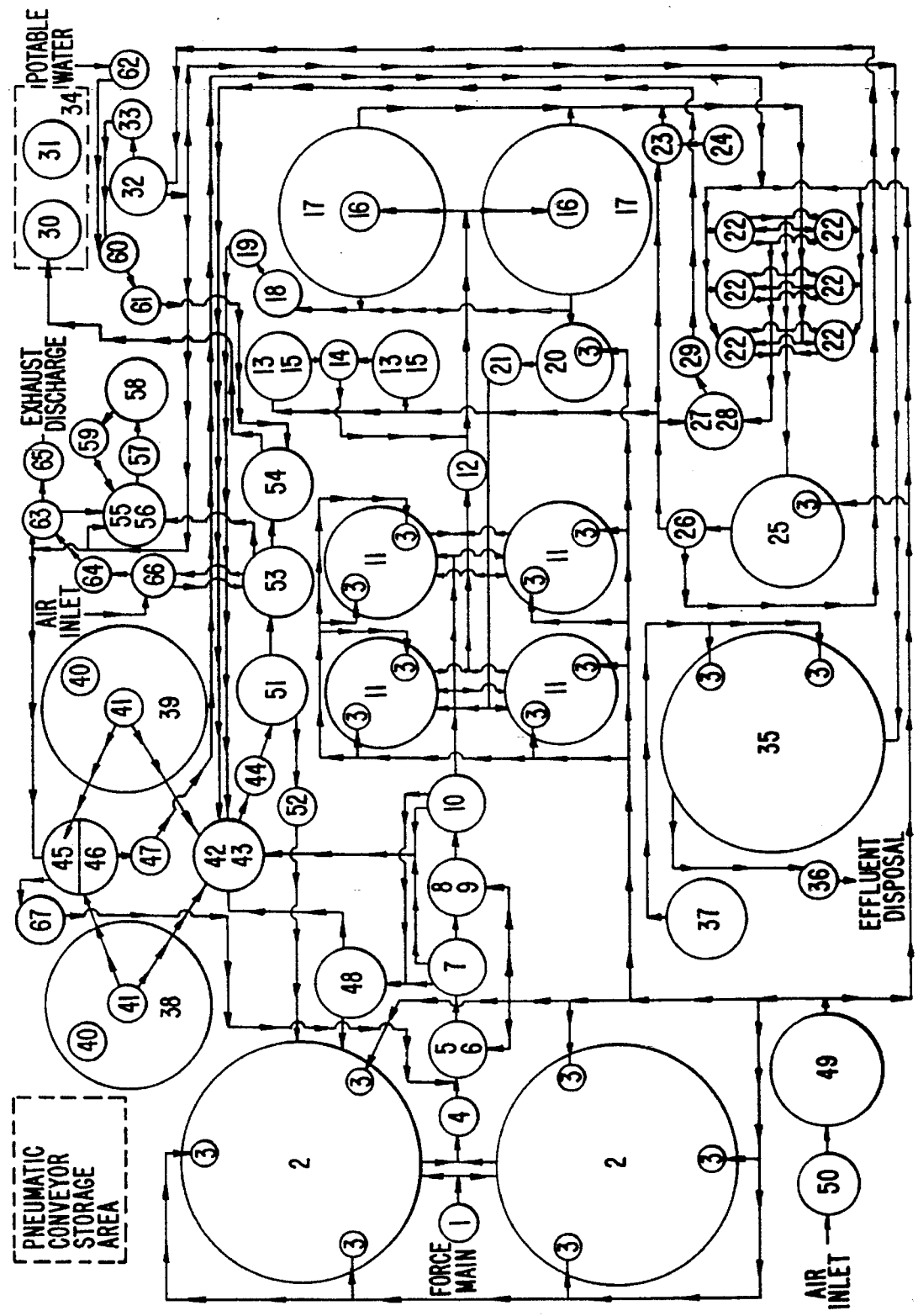
FIG. 1 illustrates a flow diagram through the major components of equipment of the present invention. Secondary items such as control valves, isolation valves, electrical supply and control equipment are not shown in FIG. 1.

The treatment of wastewater does not begin at the treatment plant. According to the present invention, the wastewater, specifically the bacteria therein, is controlled in the collection and transmission system. The oxygen content is controlled to a level such that the growth of anaerobic bacteria is substantially eliminated and the growth of aerobic bacteria is minimized. The oxygen content is controlled by use of, inter alia, centrifugal oxygenators, of the type described in U.S. patent application Ser. No. 07/109,192 and PCT application No. PCT/US86/02542.

The level of dissolved oxygen needed in both the collection and transmission system is a function of the initial concentration of both the aerobic bacteria and the retention time required before additional oxygen can be added to the wastewater. For example, for low levels of aerobic bacteria and low retention times, dissolved oxygen levels of from 0.1 to 0.3 ppm could be sufficient to maintain a positive level of dissolved oxygen throughout the complete retention time until additional oxygen could be added. In other systems, the concentration of aerobic bacteria could be naturally higher caused by water with high levels of dissolved oxygen. Such systems, with longer retention times until additional oxygen could be added, would require dissolved oxygen levels of 2.0 to 3.0 ppm to store sufficient oxygen in the liquid phase to prevent the complete destruction of the aerobic bacteria and to prevent the growth of anaerobic bacteria until additional oxygen could be added.

The need to maintain a low level of positive dissolved oxygen concentrations in all of the different systems that have variations in retention time, aerobic bacteria concentrations and dissolved oxygen levels, requires variable levels of dissolved oxygen in each collection, transmission and treatment system. The efficiency of the physical separation process is a function of the amount of bacterial development on the wastewater solids which, in turn, is controlled by maintaining the lowest possible positive dissolved oxygen levels in the collection, transmission and storage systems.

The ability to control bacterial growth in wastewater collection and transmission systems by the development of the centrifugal oxygenator allows for the application of a process system for the separation of high energy solids, with combustion values similar to coal, from the water carrier even with a solids concentration of only 0.1 to 0.2%. To complete the purification of the wastewater, a biological process must be combined with the solids separation process for the removal of the soluble organic matter in wastewater that cannot be removed by the solids separation process.

Another factor for the efficient separation of the low percentage solids is the operation of the treatment process at a constant flow rate. All currently used treatment processes must operate with flow rates that vary from as much as 250% increase over average daily flow during peak periods to as low as 10% of average daily flow during night and early morning periods. With the development of the centrifugal oxygenator which can efficiently operate at liquid levels of from two feet to 100 feet, it is possible to provide storage of wastewater in excess of the average daily flow at the treatment plant. To improve the efficiency of the present invention, a certain amount of wastewater storage at the treatment plant can be provided for dissolved oxygen control. Further, modification of the current design standards for collection and transmission systems can obtain the best cost efficiency as compared with treatment plant storage.

The current design practice for pump station wetwells in wastewater collection and transmission systems of necessity have to be confined to the smallest possible retention volume of the wastewater for the flow conditions. This restriction is imposed by the settling of solids in the wetwell and the inability to control dissolved oxygen levels in the wetwell. With the availability of the centrifugal oxygenator, it is possible to totally remove this design restriction. Wetwells can now become a storage facility for wastewater flow in excess of the average daily flow. In order to control the dissolved oxygen levels in the collection and transmission systems, retention times in pump station wetwells are the least costly method of providing the time required for the controlled transfer of dissolved oxygen into the wastewater. As the centrifugal oxygenator provides both efficient transfer of oxygen as well as hydraulic flow velocity at its directionalized discharge, settling of wastewater solids in the wetwells is no longer a consideration in the design of wetwells of pumping stations. Wastewater collection and transmission systems pump station wetwells when equipped with centrifugal oxygenators, which do not affect the operation of centrifugal pumping equipment, can now be designed to provide any retention time for the wastewater that is the most efficient for system flow requirements that vary from system to system. As long as the retention time needed for flow control exceeds the retention time needed for dissolved oxygen control, sizing of the storage wetwell would be determined by the systems' flow requirements. This method of meeting the constant flow requirement of the energy recovery sludge free wastewater treatment process of the present invention provides a second major benefit by increasing the capacity of existing transmission pipelines and reducing the size requirement and cost of future pipeline systems. In addition, the energy recovery sludge free wastewater treatment process disclosed herein eliminates the requirement for variable speed pump drives and reduces the electrical power consumption of any wastewater system.

As all wastewater transmission pipeline systems are currently designed for handling the peak flow requirement of over 200% of average daily flow, retention time in the pipeline can result in the development of dangerous problems in the pipeline system. During peak flow periods, most pipeline systems are designed so that the retention time is inadequate to allow the depletion of the dissolved oxygen levels in the wastewater by bacterial action. During the period of average daily flow, the retention time is at least doubled and during night time or early morning periods, the retention time in pipeline systems can be increased by a factor of 10 to 20 times which, in some cases, results in extensive problems of explosion hazard, corrosion of concrete and metal components, foul odor, toxic health hazards and treatment plant operational problems.

With a method for the control of bacterial growth in wastewater collection and transmission systems and the ability to operate the treatment process at a constant flow rate, the efficiency of the physical separation of the solids from the water carrier and the preservation of the combustion valve of the solids, coupled with the treatment of the soluble organic matter, makes the energy recovery sludge free process described herein possible. This process combines the separation of solids by both fiber assisted pressurized air flotation; settling using a high liquid level depth which is normally double those used in all current processes; and a solids collection and removal system that uses a concentric circular flow pattern in place of a pusher-type rake system for moving the settled solids to a central point of discharge. The multiple process reguirement is needed due to the variation in wastewater from system to system and efficient operation of the overall treatment process.

For the efficient separation of the solids from the liquid phase of wastewater by the energy recovery sludge free process, the growth of both aerobic and anaerobic bacteria must be controlled in the wastewater collection and transmission systems. Also, for efficient separation of the solids from the liquid phase, it is necessary to operate the treatment plant at a uniform flow rate. Current treatment processes are operated without control of bacteria growth and at variable flow rates that can have as much as a 25 time variation in the input flow from the collection and transmission systems.

The only means of non-destructive control of bacteria growth is the use of the control of dissolved oxygen in the collection and transmission systems. This control of dissolved oxygen eliminates the growth of anaerobic bacteria and minimizes the growth of aerobic bacteria by limiting the amount of dissolved oxygen available for growth.

In order to control dissolved oxygen in the collection and the transmission systems, retention time for the transfer of oxygen into the wastewater must be provided within these systems by the use of oversize wetwells for pump stations and the injection of oxygen in long retention pipeline systems.

This requirement is compatible with the requirement for the constant flow rate needed for efficient operation of the separation stages of the energy recovery sludge free treatment process. Using centrifugal oxygenators in pump station wetwells for dissolved oxygen control also allows the size of the wetwells of pump stations to be increased for storage of peak flow that always occurs in collection systems.

Using the storage of peak flows in collection systems, it is possible to greatly decrease the amount of storage needed at the treatment plant for efficient operation. At the same time, the use of storage wetwells provides a great amount of cost savings and a reduction in operating problems when compared to the currently used inflow demand systems.

The constant rate transmission system eliminates the design constraints of the inflow demand system which requires the output of the pump station to generally match the variable inflow of the pump station. With use of constant speed pumps operating on a selectable time basis with the excess incoming flow stored in the wetwell, control of dissolved oxygen and a nearly constant rate of flow can be delivered to the treatment plant.

The constant pressure transmission system is similar to the constant rate transmission system in that it also uses storage type pump station wetwells for dissolved oxygen control and storage of excess incoming flows. This system would be used in some cases where it is not possible to provide a large enough wetwell for the incoming flow storage. The transmission system that would require the constant pressure transmission design would have a mixture of constant speed pumps and variable speed pumps. The constant speed pump stations would be operated in the same manner as in the constant rate system and the variable speed pumping station would have its pump speed, and therefor its output, controlled by the placement of the normally used transducer speed control sensor operated based on the pressure in the force main in place of the liquid level in the wetwell. This constant pressure system provides the same constant flow rate to the treatment plant with the same operating cost savings as the constant rate system.

FIG. 1 shows a preferred treatment flow diagram for wastewater which has been controlled in the transmission and collection system as previously described.

As shown in FIG. 1, an in-line grinder/comminutor 1 is provided for the reduction of large size solids in the wastewater to a more suitable size for the physical separation process. The wastewater then flows to constant rate feed and dissolved oxygen control tanks 2.

Constant rate feed and dissolved oxygen control tanks 2 have a dual function of storing excess flow into the wastewater treatment plant and stabilizing the dissolved oxygen concentration at an appropriate level as explained above such that the growth of anaerobic bacteria is substantially eliminated and the growth of aerobic bacteria is minimized. In an average case, the level of dissolved oxygen may be between 0.5 and 1.0 parts per million (ppm). For most efficient operation, the treatment process is operated at a constant flow rate and the sizing of the tank capacities are based on the design of the collection and transmission systems and the ability to provide constant flow rates to the treatment plant. The use of a constant pressure or a constant rate design system in the transmission section supplying the wastewater treatment plant as previously described will minimize the size of the constant rate feed and dissolved oxygen control tanks 2.

Centrifugal oxygenators 3 are installed in the constant rate feed and dissolved oxygen control tanks 2 for the dual purpose of suspending solids by hydraulic flow and controlling the dissolved oxygen levels. Based on the ability of the centrifugal oxygenator 3 to provide high efficiency oxygen transfer at any liquid level above the two foot minimum level, the constant rate feed and dissolved oxygen control tanks 2 can be operated at any variable liquid level in excess of two feet to as much as fifty feet. The centrifugal oxygenator 3 is able to operate at any gas flow rate from zero to the maximum for the size unit used without any type of plugging. The centrifugal oxygenator 3 also provides for start/stop gas flow for control of the dissolved oxygen level in the constant rate feed and dissolved oxygen control tanks 2 without affecting the hydraulic suspension of the wastewater solids.

A solids handling type of centrifugal pump 4 is used to transfer the wastewater from the constant rate feed and dissolved oxygen control tanks 2 to the first stage air dispersion column 5. Due to the variable height of the wastewater in the constant rate feed and dissolved oxygen control tank 2 and a constant injection pressure required by the first stage air dispersion column 5, the centrifugal pump 4 must utilize either a flow control valve system or a variable speed drive system. Downstream of the centrifugal pump control valve, a pipeline inject point is located prior to the first stage air dispersion column 5 entry point. Fiber slurry produced by the paper to fiber with high shear mixer 45 is injected into the pipeline by the fiber slurry transfer pump 67 for contact with the wastewater solids. The fiber particles, due to their surface nature, attach themselves to the wastewater solid particles and thereby increase the separation efficiency of the pressurized air separation columns 7 and 10. To accomplish this, air is dispersed in the wastewater in first and second stage air dispersion columns 5 and 8, equipped with air dispersers 6 and 9, respectively.

In particular, as shown in FIGS. 2, 2A, 2B and 2C, the first stage air dispersion column 5 is a vertical pressurized unit with the interior of the column 5 divided into a minimum of two sections 508 and 516. The flow from the centrifugal pump 4 is introduced into the lowest section of the column 5 near the bottom of the section, but above the air distributor plate 502 through inlet 506. The bottom column head 522 contains the air supply inlet flange 524 which provides the air supply below the air distributor plate 502. The air distributor plate 502 provides for the introduction of the compressed air in a uniform manner through holes 503 to the incoming wastewater. The lowest section 508 of the column 5 is separated from the second stage 516 and any additional stages by a horizontal baffle 512 which provides the dual function of flow pattern control for efficient gas dispersion and directing the flow of the first stage 508 into the center of the column 5 to allow complete contact with the second stage air dispersion impeller 606. The first dispersion stage 508 of the column 5 has near its bottom the air distributor plate 502 which directs the flow of air into the center of the column 5 in order to allow complete contact with the first stage air disperser impeller 614. Both the first dispersion stage 508 and the second dispersion stage 516 contain vertical baffles 510 to improve the dispersion of the air into the wastewater. The second dispersion stage 516 has a horizontal baffle 504 to improve the flow pattern and efficiency of the second stage air dispersion impeller 606. The second stage air dispersion column 8 can be of similar construction to the first stage air dispersion column 5 and, if required, additional stages could be used in the design of either air dispersion column 5 or 8 to obtain suitable air dispersion in the wastewater. The air disperser drive 602 drives shaft 603 and impellets 606 and 614, and would be similar for both the first stage air dispersion column 5 and the second stage air dispersion column S. The air pressure within the dispersion column 5 is controlled by the use of a pressure relief valve 518 placed in the top head of the column 5. The wastewater air dispersion is discharged from the column 5 near the top head 520 of the column 5, i.e., just below horizontal baffle 504 through outlet 521. The top head 520 of the column 5 would have a flange-type mounting for the first stage air disperser unit.

The first stage air disperser 6 is an electric drive high shear multi-stage rotating impeller unit with the impellers 606 and 614 designed for dispersion of the air into the wastewater flow. The impellers are selected from the maximum required air flow rate which, in turn, must be determined by (1) the concentration of the solids in the wastewater, (2) the amount of fiber slurry added to the wastewater, (3) the vertical liquid flow velocity in the column, (4) the level of back pressure required for control of the air bubble rise rate, and (5) the volume of air required for efficient flotation separation of the wastewater solids.

Referring back to FIG. 1, the second stage pressurized air dispersion column 8 would be the same design as the first stage pressurized air dispersion column 5, but in the average case, somewhat smaller in diameter and designed for lower air flow rates.

The second stage air disperser 9 would also be similar to the first stage air disperser 6, but in the average case, a smaller electric motor drive could be used.

The pressurized air flotation utilizes a two-stage system of vertical columns 7 and 10 with compressed air dispersed in units 5 and 8 as described prior to the introduction of the wastewater and the air dispersion near the bottom of the columns. The vertical height and the internal flow patterns within the columns 7 and 10 must be determined by the composition of the wastewater solids. In general, the pressurization of the first stage column 7 will be higher than the second stage column 10 because the vertical rise rate of the air bubble is a function of the amount of pressure above that of the normal atmosphere pressure at the location of the treatment plant.

The ability of separation of low solids concentrations in a water phase by the air flotation process requires the attachment of the rising air bubble to a solid particle with control of the rise rate to a low enough level to maintain contact with the solid particle. Since the liquid level in the column can vary based on the composition of the solids in the wastewater, the control of the air pressure above atmospheric pressure above the top of the liquid level in the column can be adjusted for maximum solid separation efficiency. The second stage pressurized air separation column 10 would utilize a smaller diameter for almost the same liquid flow that would result in a greater vertical rise velocity of the liquid and solid phase and a lower pressurization that would increase the rise rate of the air that was introduced by a second stage air dispersion unit 8, 9 that would receive the flow from the first stage separation column 7. The first stage pressurized air separation column 7 would be selected and designed for smaller size particles using higher rates of liquid and air bubble rise rates. The solids separated at the upper level of both the first and second stage columns 7 and 10 would be withdrawn by use of a control valve and discharged from the columns using the internal pressure of the column. Any solid material with a high settling rate would be collected in the bottom of both the first and second stage columns 7 and 10 and discharged by a control valve utilizing the pressurization of the columns to a secondary concentration column 48.

The internal flow pattern of both the first and second stage separation columns 7 and 10 utilizes a circulating horizontal directionalized flow of the wastewater and air dispersion. The bottom stage of both columns allows the flow to either travel downwardly into the high density solids removal stage or upwardly into the first flotation stage of the columns. Additional flotation stages are stacked above the first flotation stage, but these stages have a flow pattern somewhat different from the first stage. The vertical travel flow path would be the same as the first stage, but a second flow pattern would be used for the separated liquid phase. The liquid flow would utilize a horizontal slotted opening located directly above the horizontal stage separation baffle that would discharge into a vertical closed pipe or formed section of the column to remove the separated liquid phase, as described hereinafter.

Figure 3A:
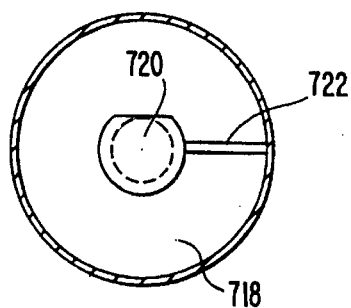
FIGS. 3A and 3B are top cross-sectional views of the pressurized air separation column of FIG. 3 along lines 3A—3A and 3B—3B, respectively.
Figure 3B:
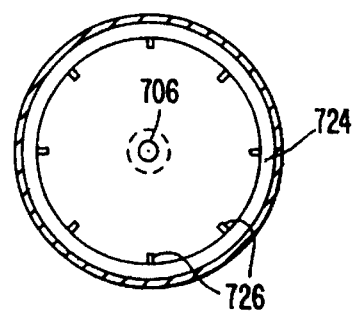

The first stage pressurized air separation column 7 (shown in more detail in FIGS. 3, 3A and 3B) has a vertical two section design with the inflow of the wastewater and air dispersion introduced into the column settling section 730 by way of the circular ring inlet manifold 724 and the opposed liquid velocity inlet nozzles 726. By utilizing an opposed liquid velocity inlet design of the nozzles 726, the velocity head of the liquid is dissipated and a low velocity circular flow pattern is created in the center of the column 7. In the low velocity circular flow pattern of the center of the column 7, high density solids (grit and other inorganic solids) settle to the bottom of the column bottom head 704 and are discharged under column pressure through the high density solids discharge 706 by use of an exterior control valve. The light density solids and waster phase rise vertically in the low velocity circular flow pattern of the column settling section 730 and are discharged into the column flotation section 728 which is divided from the column settling section 730 by the column divider plate 718. The light density solids and the water phase are introduced into the column flotation section 728 using the low density solids and water directionalized inlet distribution 720 and the baffle for directionalized flow 722. The low density solids and water phase travel in a circular vertical rise pattern over the fixed vertical flight light density solids conveyor 716. The center of the fixed vertical flight light density solids conveyor 716 is a circular enclosed pipe section which forms the separated water discharge pipe 712. Water is separated from the light density solids using inlet openings 714 located in the separated water discharge pipe 712 at a position just above the points of flight where the light density solids conveyor 716 comes in contact with the separated water discharge pipe. The collector discharge water flow inlet openings 14 of the separated water discharge pipe 712 allow the discharge of the separated water through the top head 702 by the separated water discharge outlet 710. The fixed vertical flight light density solids conveyor 716 allows the light density solids to collect under the top head 702 between the outer wall of the column and the separated water discharge pipe 712 where they are discharged under the column operating pressure through the light density solids discharge outlet 708 using an exterior control valve.

Referring back to FIG. 1, the second stage pressurized air separation column 10 would be similar in design to the first stage pressurized air separation column 7, but in the average case, somewhat smaller in diameter and with the internal pressure controlled at a lower level than the first stage pressurized air separation column 7 for control of both the air bubble rise rate and the vertical liquid velocity.

The floatable solids from the top stage of both the first and second stage separation columns 7 and 10 would be discharged under pressure by a control valve and transferred to the slurry mixing tank 42 for mixing with other flow streams prior to dewatering.

The high density solids collected in the bottom stage of both the first and second stage pressurized air separation columns 7 and 10 would be discharged under pressure by control valves to a secondary concentration column 48.

The concentration column 48 would also be a pressurized stage with the underflow discharged into the same slurry tank 42 as the solids from the top flotation stage of the first and second stage separation columns 7 and 10. The overflow of the concentration column 48 would be discharged into the constant rate feed and dissolved oxygen control tank 2.

After the separation of both the floatable solids and the high density settleable solids from the two-stage pressurized air separation columns 7 and 10, the wastewater would be discharged under pressure to a series of batch/continuous aeration tanks 11 with operating liquid levels of a minimum of twenty feet or up to fifty feet depending on the liquid level of the pressurized air separation columns 7 and 10 and their operating pressure. As one of the aeration tanks 11 is being filled by the flow from the separation columns 7 and 10, other tanks 11 are used for bacterial oxidation of the soluble organic material or for providing the constant rate feed to the settling tanks 17 of the invention.

By eliminating variations in flow rates and the inaccuracy of a continuous flow-through system, accurate control of the bacteria action by control of dissolved oxygen and the concentration of bacteria are possible, which results in a massive reduction in the requirement for return of highly active sludge to provide the needed concentrations of bacteria for rapid growth. The retention time required in the batch/continuous aeration tanks 11 needs only to be sufficient for the oxidation of the soluble matter in the wastewater. In the average case, this can be done in one to three hours, with proper control of the amount of activated sludge addition and the control of the dissolved oxygen level.

The aeration tanks 11 receive their input flow from the second stage separation column 10 under pressure and the maximum height of the aeration tanks 11 is determined by the liquid level and operating pressure of the second stage pressurized air separation column 10. The tanks 11 are operated in a batch/continuous method with the constant rate flow from the second stage separation column 10 directed to one of the aeration tanks 11 by control valves. The aeration tanks 11 are designed for a retention time of one to three hours depending on the amount of soluble material in the wastewater received from the second stage pressurized air separation column 10. The aeration tanks 11 are equipped with a centrifugal oxygenator 3 for solid suspension and oxygen transfer at variable liquid levels. Unlike aeration tanks currently in use, the batch process eliminates the variables of a flow-through system and allows for control of both the bacteria concentrations and the level of dissolved oxygen in the aeration tanks 11. The control of the bacteria concentration would be by the addition of a defined amount of return activated sludge with known bacteria concentrations from the sludge storage and activation tank 20. The dissolved oxygen level in the aeration tanks 11 is controlled at a lower level as compared to current process designs for aeration tanks, the purpose of which is to oxidize wastewater solids as well as soluble material. In the average case, this dissolved oxygen level would be in the range of 2 to 4 ppm. The use of the centrifugal oxygenator 3 provides the ability to maintain this dissolved oxygen level during the filling and discharge cycle of the aeration tanks 11. The discharge from each of the aeration tanks 11 would be to the clarifier tanks 17 using an aeration-tank-to-clarifier-transfer-pump 12 with a valved flow rate control system that would provide a constant rate of feed to the clarifier tanks 17.

Figure 4:
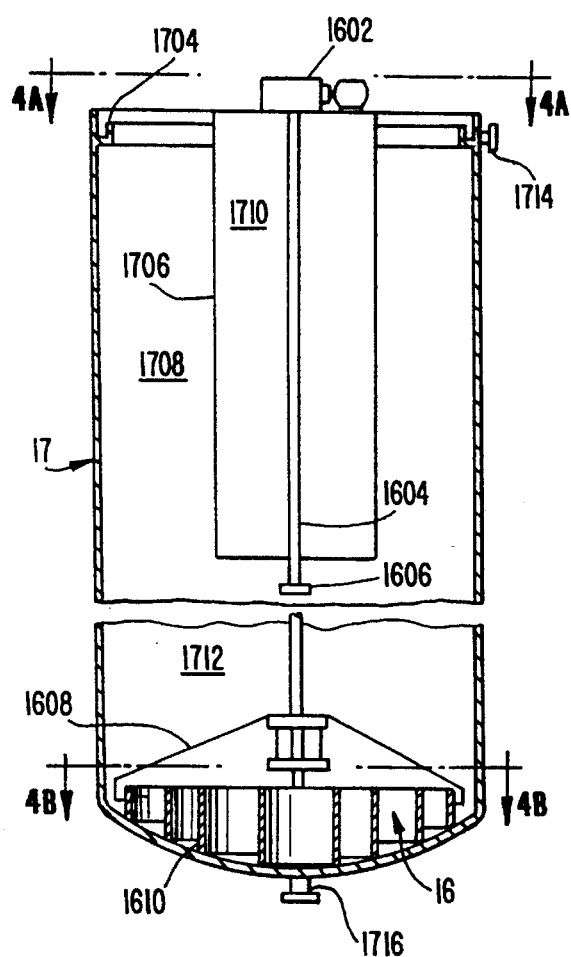
FIG. 4 is a side cross-sectional view of a clarifier or settling tank including a coil track conveyor which may be used in the present invention.
Figure 4A:
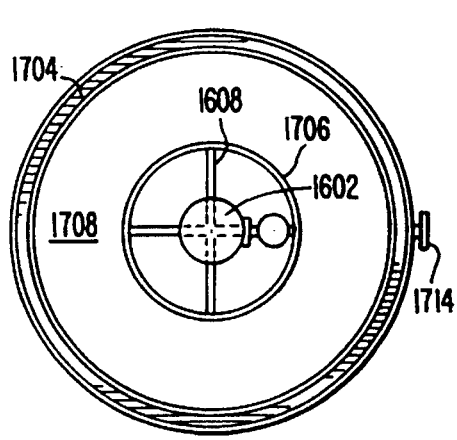
FIGS. 4A and 4B are top cross-sectional views of the clarifier or settling tank of FIG. 4 along lines 4A—4A and 4B—4B, respectively.
Figure 4B:
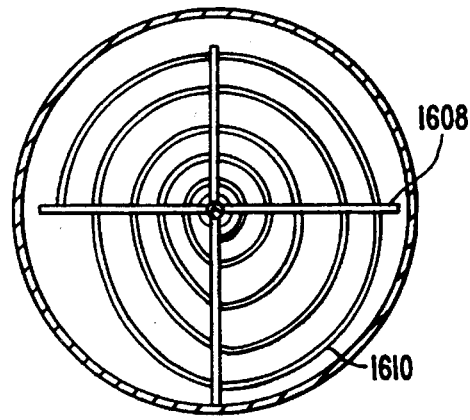

Due to the small amount of solids, the low concentration of active bacteria and the controlled level of dissolved oxygen, it is possible to use a high efficiency deep liquid level settling system. Also, the use of a constant flow rate through the deep liquid level settling system greatly increases the separation efficiency as compared to currently used low liquid level variable flow clarifiers. The deep liquid level settling system with coil track solids conveyor is shown in more detail in FIGS. 4, 4A and 4B. The feed to the settling system (clarifier tanks) 17 is provided from the batch/continuous aeration tanks 11 by the aeration tanks to clarifier transfer pump 12 using a control valve to provide a constant flow rate. Coagulant chemicals are added from the coagulant tanks 13 with mixer 15 by the coagulant pump 14. This flow is made to the settling system (clarifier tanks) 17 through the inlet flow directional circular containment baffle 1706 which provides the coagulant contact zone 1710. From the coagulant contact zone, the downward flow passes into the settling zone 1712 of the clarifier tank 17. The water phase then passes through the clarified water phase rise zone 1708 into the overflow weir 1704 and through the clarified water phase discharge 1714. The solids deposited into the bottom of the settling zone 1712 are moved to the settled solids discharge 1716 by the coil track conveyor 16. The coil track conveyor 16 consists of an electric motor drive coil track conveyor gear reduction drive 1602, the coil track drive shaft 1604, the coil track conveyor drive shaft bearing 1606, the coil track conveyor support member 1608 and the coil track 1610. The coil track conveyor action for the movement of solids is completely different from the solids moving equipment currently in use in wastewater treatment plants that utilize a racking or pushing action to move the solids to a discharge point. The coil track conveyor 16 applies a rotary centrifugal squeeze principle to transport the solids across the bottom of the settling tank to a point of discharge. The rotary centrifugal squeeze movement of solids slurry reduces the amount of solids re-suspended as compared to the raking or pushing action of currently applied solids movement systems used in wastewater treatment clarifiers.

Referring back to FIG. 1, the coagulant feed tanks 13 are vertical open top preparation and storage tanks suitable for preparation and storage of several types of solutions of chemicals which could be used in assisting the settling of solids that were not removed in the pressurized air separation columns 7 and 10. The selection and concentrations of the coagulant aids would be based on settling tests in each plant. The variation in wastewater composition from system to system requires individual selection of the coagulant aid that will be the most effective in assisting the settling of the solids in the clarifier tanks 17.

The coagulant feed pump 14 obtains its supply of coagulant solution from the coagulant feed tanks 13 and injects the solution into the pressurized pipeline transferring the wastewater from the aeration tanks 11 to the clarifier tanks 17 provided with coil track conveyor 16.

The coagulant mixers 15 are standard solution mechanical drive electric motor-driven units of suitable size to provide solution of solid materials in the internal reuse effluent used in the coagulant feed tanks 13.

The liquid level in the clarifier, or settling tank 17, would in almost all cases be at least double that of currently used systems. With the use of a constant flow rate input to the clarifier tank 17 coupled with the removal of most of the wastewater solids in the pressurized air separation columns 7 and 10 and the control of dissolved oxygen at all times from the feed transferred from the aeration tanks 11, bacterial growth in the clarifier tanks 17 can be controlled. The retention time in the clarifier tanks 17 would be based on optimum settling time requirements without consideration of anaerobic bacterial growth.

The sludge from the settling tanks 17 is transferred by gravity into a small storage tank 18 which, in turn, is then transferred as needed by a centrifugal pump 19 to the slurry tank 42 feeding the dewatering system. Sludge from the settling tanks 17 needed to meet the requirements for activated sludge in the aeration tanks 11 is stored in the sludge storage and activation tank 20.

As the sludge underflow from the settling tank 17 has a low concentration of both dissolved oxygen and aerobic bacteria, it is necessary to store the sludge in a controlled aeration tank 20 in order to increase these concentrations to needed levels. The sludge storage and activation tank 20 is of suitable size to provide retention time to meet the required concentration of bacteria for return to the aeration tank system. By using the centrifugal oxygenator 3 as a means of control of the dissolved oxygen at variable liquid levels, the concentration of the aerobic bacteria can be maintained in the storage and activation tank 20 so that a known amount of activated sludge can be transferred to the aeration tanks 11 to meet the requirement of the bacterial oxidation of the soluble matter in the wastewater. The return of the activated sludge from the storage and activation tank 20 is by the use of a centrifugal pump 21 with either flow measuring equipment or a timed pumping cycle control.

The sludge transfer supply tank 18 is a vertical open top tank and would receive the excess sludge flow from the bottom of the clarifier tank 17 by gravity. The control of the feed of excess sludge would be based on the requirement of the level in the sludge storage and activation tank 20. The sludge transfer supply tank 18 would serve as a wetwell for the sludge transfer pump 19 and would contain a small amount of storage capacity that would allow selection of the time cycle for transfer of the excess sludge to the dewatering feed slurry tank 42.

The sludge transfer pump 19 takes its suction from the sludge transfer supply tank 18 and transfers the sludge through a pipeline system to the dewatering feed slurry tank 42, as required.

The sludge storage and activation tank 20 is supplied by gravity flow from the bottom of the clarifier tanks 17. A liquid level control in the sludge storage and activation tank 20 would be used for control of the sludge flow from the clarifier tank 17 into the sludge storage and activation tank 20 with all excess sludge being sent by control valves to the sludge transfer supply tank 18. The sludge storage and activation tank 20 uses centrifugal oxygenators 3 for control of the dissolved oxygen level in the sludge storage and activation tank 20. As a high concentration of bacteria is needed in the activated sludge returned to the aeration tanks 11, the dissolved oxygen level would be controlled in a normal range of 5 ppm. With a known bacterial requirement in the batch/continuous aeration tanks 11 and a known concentration of bacteria in the sludge storage and activation tank 20, an accurate and defined return of the activated sludge solids can be made. Only the minimum amount of activated return sludge would be used for the necessary bacterial oxidation of the soluble matter in the wastewater.

The return activated sludge transfer pump 21 could be either a centrifugal type with flow control or flow measuring equipment or a positive displacement pump with a timed operating cycle. The pump would take suction from the sludge storage and activation tank 20 and transfer the sludge through a pipeline and directional valve system to any one of the aeration tanks 11 as selected.

The contact columns 22 are preferred filtering media and receive their input flow by gravity from the overflow of the settling tanks 17. Due to the high liquid level of the settling tanks 17, the contact columns 22 operate on a gravity flow basis. The contact columns 22 consist of a flow-through support system of either perforated metal plate material covered with wire support screen or any other type of flow-through support system that will contain the contact media and allow the liquid phase to flow through the contact area of the deep bed media and allow the backflow of compressed air for the discharge of the spent media.

The contact media is a mixture of pulverized coal and shredded waste paper fibers or similar waste material. The slurry is prepared in a mixing tank 46 located in the fuel preparation area and transferred to each individual contact column by a centrifugal pump 47 and pipeline system with control valves. The spent contact media is removed as required from each of the contact columns 22 through a control valve piping system located just above the media support using the gravity flow from the settling tanks 17 and the introduction of compressed air through a distributor pipe located directly below the media support system. The spent media slurry is discharged into a storage tank 27 equipped with a mixer 28 and, in turn, is transferred, as needed, to the slurry tank 42 feeding the dewatering system by a centrifugal slurry pump 29 and pipeline system.

Unlike the currently used shallow bed sand or sand-and-coal filter systems, the contact columns 22 would not use a water backwash system that in almost all cases requires a large amount of water for cleaning of the solids trapped in the media. The return of this backwash water to the treatment system can cause a large increase in the flow-though demands of the treatment plant. Also, the replacement of the media, when required, can present major costs in both labor and out-of-service time.

The contact columns 22, due to the high liquid level in the clarifier tank 17, can use a media depth of from four feet to as much as fifteen feet to meet the effluent disposal requirements of each wastewater treatment system for the removal of solids and bacteria by attachment of the solid particles and bacteria to the surface of the coal and shredded paper fiber mixed media. As the media contains both hard particles and fiber surfaces, attachment of the small size solids that have not been separated in either the flotation or settling stages is much more efficient than in the sand or sand-and-coal media systems that contain only hard particle surfaces. Removal and replacement of the media in the contact columns does not require labor input and can be done on a fully automated basis without affecting the through-put flow of the wastewater system. Loading of media into each individual contact column 22 is done by transfer of the coal and paper slurry from the storage preparation area by a centrifugal slurry pump 47 and pipeline system with automatic valve control. The reused effluent used to prepare the media slurry is discharged into the inlet of the contact column system and, in turn, returned to the chlorine contact and reuse storage tank 25. The spent media slurry is transferred to the slurry tank 42 feeding the dewatering system and only the excess water from the dewatering system is returned to the constant rate feed an dissolved oxygen control tank 2 which, in turn, is reintroduced into the wastewater flow through the plant.

Figure 5:
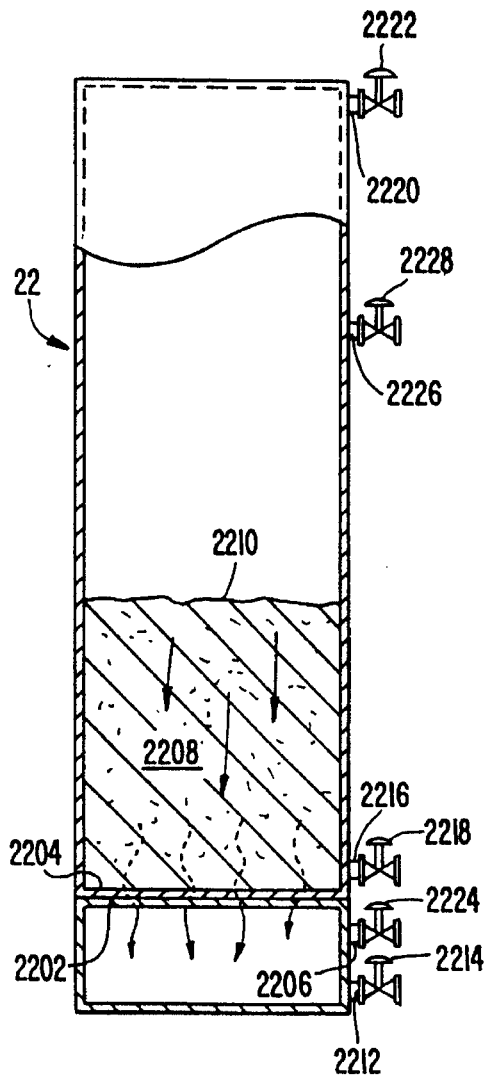
FIG. 5 is a side elevational view, partially in section, of a contact column which may be used in the present invention.

In particular, the effluent contact columns 22 are vertical open top columns with (as shown in FIG. 5) a support system near the bottom of the column normally consisting of a perforated support plate 2202 and a woven metal, cloth or plastic media support member 2204. Located directly below the support system is a compressed air inlet pipe system 2206 for use in connection with the removal of the spent contact media. The flow throughout the contact columns 22 is by gravity based on the level of the discharge from the overflow of the clarifier tanks 17. Any wastewater solids not removed in the clarifier tanks 17 flow downwardly through a coal and paper fiber media 2208 of the contact columns 22 in which the solids are trapped on or in the particles of the coal or deposited on the paper fiber. The level 2210 of the mixed media 2208 and also the percentage of coal to paper fiber in the media would be determined on each installation in order to provide the most efficient operation of the effluent contact columns 22. The diameter of the effluent contact columns 22 would also be established by the number of columns to be installed and the capacity of the wastewater treatment plant. The loading of the media 2208 into the columns would be an individual operation for each column using a batch process with the mixed media prepared in the coal and paper fiber slurry tank with mixer 46 and the centrifugal slurry pump 47 for transfer of the coal/paper slurry. The mixed media containing the correct ratio of coal and paper fiber would be prepared in the coal and paper fiber slurry tank with mixer 46 by using the feed from the paper to fiber tank with high shear mixer 45 and coal directly from the pulverized coal storage tank 38. Additions of internal reuse effluent would be used to provide proper dilution of the slurry to a suitable level for pipeline transfer to an effluent contact column 22 by way of the media inlet control valve 2226 and the media inlet 2228. Additional internal reuse effluent would be used to flush the pipeline after transfer to prevent solids settling and plugging of the pipeline system. The excess flow of the internal reuse effluent could also be used to compact the mixed media 2208 in the effluent contact columns 22, if needed. After flowing through the media bed, the water phase would be returned to chlorine contact and reuse storage tank 25 by gravity flow through a discharge pipeline 2212 connecting the effluent contact columns 22 to the chlorine contact and reuse storage tank 25. The operation of the effluent contact columns 22 would be on the basis of the differential pressure over the height of the media bed. High differential pressure would indicate the mixed media bed was loaded with wastewater solids removed from the overflow of the clarifier tanks 17. When this occurs, a control valve 2214 on the column discharge pipe 2212 is closed and a media discharge control valve 2218, in a location directly above the support system for the media, would open. Compressed air would be introduced through the air inlet 2206 by the air inlet control valve 2224 directly below the support system for the media which, in turn, would flow upwardly at a high velocity to break up the compacted media bed 2208 and allow its removal by gravity flow by the effluent received from the overflow of the clarifier tanks 17. The spent mixed media 2208 would flow by gravity through the media discharge 2216 and media discharge control valve 2218 to the spent coal/paper re-slurry tank 27. After removal of the spent media 2208, the operational cycle would be repeated starting with the media 2208 loading procedure outlined above. During the period of media 2208 loading, the inlet control valve 2222 located on the column inlet 2220 would be closed to prevent the introduction of untreated flow out of the contact column 22. The number and size of the columns would be based on plant rating with a minimum of one column out of service for media replacement.

The gravity overflow from the clarifier tanks 17 is treated by the addition of chlorine, or other similar chemicals, prior to its introduction into the contact columns 22 in order to maintain a high level of chlorine concentration in the contact column. The addition of chlorine at this point terminates the growth and destroys activity of the aerobic bacteria which, in turn, assists in the bacterial reduction of the wastewater effluent that occurs in the coal and fiber media bed 2208 of the contact columns 22.

For normal installation, a gas chlorinator 23 shown in FIG. 1 may be provided, although other chemicals such as ozone could be used in place of the gas chlorinator 23. The gas chlorinator 23 would be supplied with internal reuse effluent under necessary pressure to provide solution of the chlorine gas into the water. The resulting solution would be injected into the discharge pipeline of the clarifier tank 17 prior to its entrance to the effluent contact columns 22. The introduction of chlorine at this point is for the purpose of providing assistance in the reduction of bacteria provided by the media 2208 of the effluent contact columns 22.

The chlorine gas supplied to the gas chlorinator 23 may be provided by, e.g., one ton or smaller pressurized storage cylinders 24.

Figure 6:
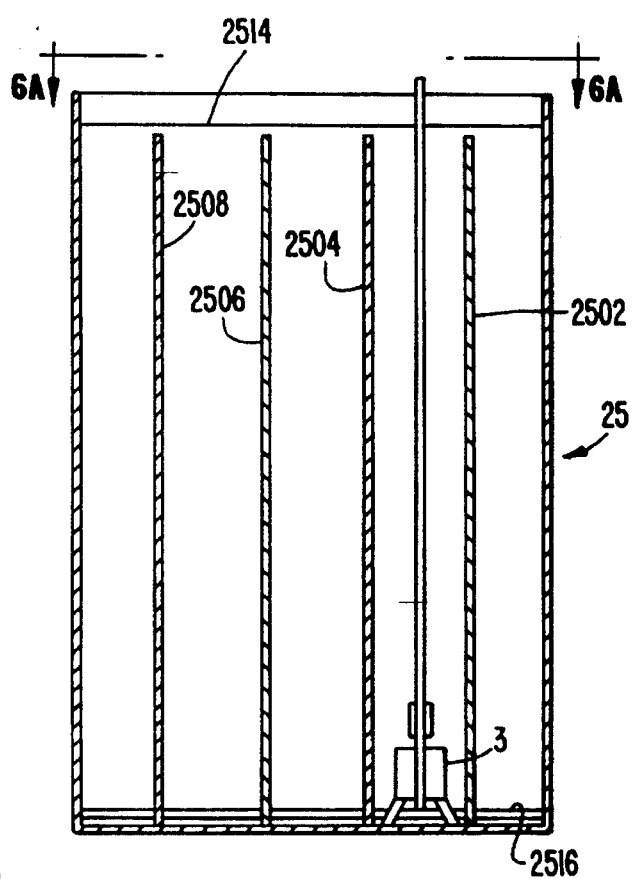
FIG. 6 is a side cross-sectional view of a chlorine contact and reuse storage tank which may be used in the present invention.
Figure 6A:
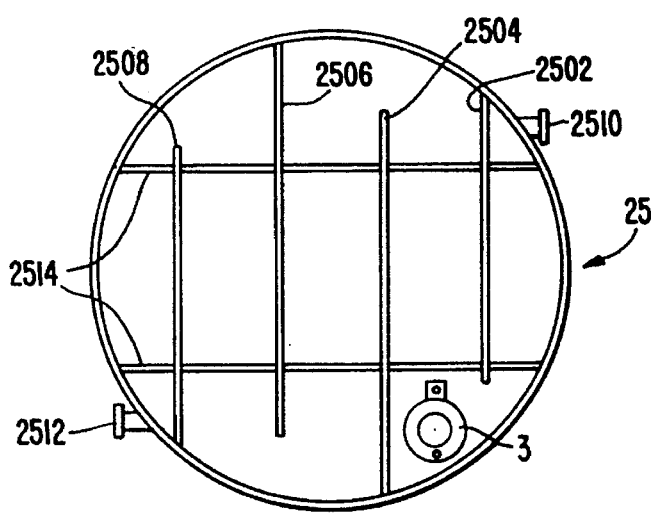
FIG. 6A is a plan view of the chlorine contact and reuse storage tank of FIG. 6 along line 6A—6A.

After discharge from the contact columns 22, the effluent flows by gravity into the chlorine contact and reuse storage tank 25 (shown in more detail in FIGS. 6 and 6A) through inlet 2510. As with the entire energy recovery sludge free treatment process of the present invention, the height of the chlorine contact and reuse storage tank 25 would preferably be more than double that currently used. The interior of the tank 25 would be equipped with flow directional baffles 2502–2508, top baffle support plate 2514 and bottom baffle support plate 2516 that would prevent any short-circuiting of the flow and ensure adequate retention time for removal of excess chlorine by air stripping using a centrifugal oxygenator 3. The chlorine contact and reuse storage tank 25 would be sized on the variable effluent reuse factor which would always be in excess of the time required for removal of the excess chlorine from the wastewater prior to its reuse in the condenser 32 and other needs within the treatment process system.

The internal directionalized flow baffles 2502–2508 of the chlorine contact and reuse storage tank 25 would prevent the inlet flow from reaching the outlet of the tank 25 without being subject to the minimum retention time required for the reduction of excess chlorine by air stripping using a centrifugal oxygenator 3. The size of the tank 25 would be based on plant capacity and a minimum retention time of one hour. Underflow baffles would be used to allow the tank 25 to operate at variable liquid levels. The chlorine contact and reuse storage tank 25 would also act as a wetwell for the water reuse centrifugal pump system 26 which would take its supply of water from the chlorine contact and reuse storage tank 25 as shown in FIG. 1. As the flow of the wastewater treatment plant is a constant rate, storage is provided for the internal effluent reuse flow to the condenser 32. Almost all of the internal reuse flow would be directed to the condenser 32 of the electric power generation section of the plant. Other internal uses of the effluent reuse water system would be (1) water supply to the coagulant aid system 13, 15, (2) gas chlorinator system 23, (3) spent media coal/paper re-slurry tank 27, (4) coal and paper fiber slurry tank 46, (5) paper to fiber tank with high shear mixer 45, (6) ash slurry tank 55, and (7) wet scrubber system 63.

After use as cooling water in the condenser 32 of the power plant section of the treatment plant, the internal reuse effluent is returned for final treatment in the effluent storage and dissolved oxygen control tank 35. Due to the possible temperature rise caused by the heat transfer of the condenser 32, adjustment of the dissolved oxygen levels of the effluent may be required. In most cases, the use of air to reach saturation levels of dissolved oxygen, which is sometimes required for effluent reuse, will require many hours of retention with standard aeration devices and will not allow operation of the storage tanks at variable liquid levels. The present invention again utilizes the ability of the centrifugal oxygenator 3 to operate with a pure oxygen feed directly from storage cylinders 37 to rapidly and efficiently reach a saturation level of dissolved oxygen even under variable levels of storage tank operation.

Effluent storage and dissolved oxygen control tanks 35 would be of similar design to the chlorine contact and reuse storage tank 25 with internal flow directional baffles to provide maximum retention time without short-circuiting and would also utilize underflow internal baffles to allow for variable level operation of the storage tank 35. The number and size of the effluent storage and dissolved oxygen control tanks 35 would be dependent on the exterior disposal requirement of the system. If conditions allowed the constant rate use of the effluent, only a small amount of total retention time would be required for the control of the dissolved oxygen levels which would, in the average case, be less than one hour of plant through-put. Except in the case of tropical locations, the use of the exterior disposal dissolved oxygen control systems would only be required during summer months or periods of high water temperature.

The effluent internal reuse supply centrifugal pump system 26 would take suction from the chlorine contact and reuse storage tank 25 and would be sized to accept the complete plant flow. The system could, in some cases, be a single unit; in the average case, due to the different flow and pressure requirements, multiple units would be needed. The balance of the flow of the effluent internal reuse supply centrifugal pump system 26, after meeting the needs of (1) the coagulant feed tanks 13, (2) gas chlorinator 23, (3) spent coal/paper re-slurry tank 27, (4) paper to fiber tank with high shear mixer 45, (5) coal and paper fiber slurry tank with mixer 46, (6) ash slurry tank 55, and (7) the wet scrubber system 63, would be sent to condenser 32 and, in turn, returned under pressure of the water reuse supply pump system 26 to the effluent storage and dissolved oxygen control tank 35.

The spent coal/paper re-slurry tank 27 can be a vertical open top tank sized to retain the output of solids and liquids produced by the removal of the spent media of the effluent contact columns 22. The spent coal/paper re-slurry tank 27 would also receive additional reuse water as required for pipeline flushing from the internal effluent reuse supply centrifugal pump system 26.

The spent coal/paper re-slurry tank 27 could be equipped with, e.g., an electric driven mechanical mixer 28 of sufficient horsepower to provide complete suspension of solids in the liquid carrier.

The spent coal/paper transfer pump 29 could be either of the centrifugal or positive displacement type dependent on the size of the plant and the distance between the spent coal/paper re-slurry tank 27 with mixer 28 and the dewatering feed slurry tank 42. The operation of the spent coal/paper transfer pump 29 would start with the pipeline between the spent coal/paper transfer pump 29 and the dewatering feed slurry tank 42 being filled with internal reuse effluent. The slurry flow from the spent coal/paper re-slurry tank 27 would be transferred on a continuous basis, once started, to prevent pipeline plugging. In the event that the slurry transfer needed to be stopped, the spent coal/paper transfer pump 29 suction would be closed off from the spent coal/paper re-slurry tank 27 by an automatic control valve and receive pipeline flushing water from the internal effluent reuse supply centrifugal pump system 26 by a second automatic control valve.

A package-type, factory built, low pressure steam turbine 30 provides the drive system for an electric generator 31. The steam turbine 30 is supplied with steam by the boiler 54 which would be sized in accordance with the capacity and pressure of the boiler 54.

A package-type, factory-built electric generator 31 is driven by the steam turbine 30 of suitable size to match the output of the generator 31.

A package-type, factory-built condenser 32, with the average size plant using the shell and tube type, may be used to receive the discharge steam from the turbine 30 and return the condensed boiler water to the de-aerating feed water heater 60. The sizing of the condenser 32 may be based on the discharge conditions of the generator 31 and the allowable increase in effluent temperature.

A package-type, factory-built condensate return tank and pump 33 collects the condensate from the condenser 32 and returns the condensed boiler water to the de-aerating feed water heater 60.

To provide water protection for the steam turbine 30 and the electric generator 31, a building 34 may be provided having suitable size for only these items of equipment.

The effluent storage and dissolved oxygen control tanks 35 can be vertical open top tanks with the height determined by the pressure of the water reuse system 26 returned from the condenser 32. The effluent storage and dissolved oxygen control tanks 35 would be of similar construction to the chlorine contact and reuse storage tank 25 with directionalized flow baffles and underflow openings to allow for variable liquid level operation of the tanks. To control the dissolved oxygen levels in the tank, centrifugal oxygenators 3 would be installed in the inlet flow channel and at other points in the tank flow pattern as needed for the addition of pure oxygen or enriched oxygen into the effluent. The centrifugal oxygenators 3 would receive the oxygen supply directly from the oxygen storage cylinders 37 in either a gas or liquid form. The performance of the centrifugal oxygenator 3 would be improved by the lowering of the water temperature and resulting increase in oxygen solubility that results from the lower temperature. Due to the large flow-through volume and the short retention time in the collector of the centrifugal oxygenator 3 coupled with the high shear agitation, freezing or dispersion problems would not be encountered with a low temperature oxygen feed.

The effluent disposal centrifugal pump system 36 would be suitable for the individual plant effluent disposal needs. As the effluent quality would be suitable for any type of non-potable water usage such as lawn watering, irrigation, commercial applications or environmental reuse, the pressures required for effluent disposal would vary even in the average size plant. The pump would take its suction from the effluent storage and dissolved oxygen control tank 35.

The oxygen storage cylinders 37 may be, in the case of the average size plant, one ton pressurized liquid oxygen cylinders of similar construction to the chlorine storage cylinders 24. The liquid oxygen storage cylinders 37 would supply pure or enriched oxygen directly to the centrifugal oxygenator 3 located in the effluent storage and dissolved oxygen control tanks 35.

In order to provide the needed controlled feed of both pulverized coal and shredded waste paper material, coal and paper storage tanks 38 and 39 of the vertical type with sufficient height to allow gravity feed of the coal and shredder waste paper are provided. The size of the storage tanks 38 and 39 would be dependent on the size of the wastewater treatment plant and the time and cost factor of resupply caused by the location of the treatment plant. Both storage tanks 38 and 39 would normally utilize a high density pneumatic air system for transfer of both the coal and paper from truck or rail cars into the top section of the storage tanks 38 and 39. For this reason, both of the storage tanks 38 and 39 would be equipped with dust collector systems 40. For larger size plants, on-site pulverizing and shredding equipment could be used, thus allowing the use of normal coal supplies and bulk waste paper.

The feed from both the coal and paper storage tanks 38 and 39 would be controlled by the use of rotary or similar type of solid material feeders 41 with dual discharges from both tanks 38 and 39. The primary discharge from both storage tanks 38 and 39 would be into the dewatering slurry tank 43 which, in turn, would feed directly into the high density mixer 42 located in the bottom of the dewatering slurry tank 43. The ratio of both coal and paper feed would be controlled to provide the best possible efficiency of operation of the dewatering device 51. The total amount of coal and paper feed would be determined based on each wastewater treatment plant's wastewater solids heating value and the overall fuel requirements of the power generation section of the wastewater treatment plant. Minimum requirements for coal and paper are determined by the increase in operating efficiency of the dewatering device 51 which is provided by the coal and shredded waste paper added directly to the separated solids flow returned from the wastewater treatment process.

The secondary feed from the coal storage tank 38 would be directed into the coal and paper fiber slurry tank with mixer 46. The secondary feed from the paper storage tank 39 would be directed into the paper to fiber slurry tank with high shear mixer 45. After reduction to a fiber slurry, the slurry would be transferred by gravity to the coal and paper fiber slurry tank with mixer 46 and by the fiber slurry transfer pump 67 into the pipeline feeding the first stage air dispersion column 5. The amount of paper fiber added would be determined to provide high efficiency operation of the first stage pressurized air separating column 7 and the second stage pressurized air separation column 10. The second feed from the shredded paper waste material storage tank 39 would be into the dewatering feed slurry tank 42. The second feed from the paper to fiber tank with high shear mixer 45 would be by gravity into the coal and paper fiber slurry tank with mixer 46. The ratio of coal to paper fiber added to the coal and paper fiber slurry tank would be determined for each plant based on the loading and the quality requirement of the effluent disposal usage. The total amount of coal and paper placed in the coal and paper fiber slurry tank with mixer 46 by the feeders would be dependent on the media depth of the contact columns 22 found to be the most efficient for the individual plant operation. The size of the slurry tank would be determined by the size and media depth of each contact column 22 and each column 22 would be reloaded with media on an individual basis at the same time other columns 22 were in operation. Transfer of the slurry media from the coal and paper fiber slurry tank with mixer 46 located at the storage area of the plant would be by the centrifugal pump for transfer of coal/paper slurry 47 and a pipeline system with control valves to directionalize the slurry flow into the contact column 22 selected for reloading.

The pulverized coal storage tank 38 may be of the vertical closed type with cone-shaped bottom discharge in order to provide for gravity discharge of the coal from the storage tank 38. The tank 38 may have a structural support base that would place the discharge of the tank 38 at a suitable level to allow gravity feed to both the dewatering feed slurry tank 42 and the coal and paper fiber slurry tank with mixer 46. The pulverized coal storage tank may be designed for high density pneumatic loading of coal from either rail cars or truck bulk carriers. The size of the pulverized coal storage tank 38 would be dependent on the capacity of the treatment and the ease of supply of the coal to the plant site. Also, on-site pulverization could greatly reduce the size of the storage tank 38.

The shredded paper waste material storage tank 39 could be of similar design and construction to the pulverized coal storage tank 38, but normally of larger size due to the multiple usage of the paper (a) the air separation stages, (b) the sludge dewatering stage, and (c) the mixed media of the contact columns coupled with its lower bulk density as compared to coal. As with the pulverized coal storage tank 38, if bulk storage facilities were available, the size of the shredded paper waste material storage tank 39 would be greatly reduced if resupply was provided on an on-site shredder.

Dust collector 40 of the dry type can be installed on the top of both the pulverized coal storage tank 38 and the shredded paper waste material storage tank 39 to allow high density pneumatic loading of the tanks without environmental pollution.

Duplex rotary feeders 41 of the solids handling type may be installed at the bottom of the discharge cone of both the pulverized coal storage tank 38 and the shredded paper waste material storage tank 39. The duplex rotary feeders 41 would provide an individually controlled feed of coal into both the dewatering feed slurry tank 42 and the coal and paper fiber slurry tank with mixer 46. The other set of duplex rotary feeders would provide an individually controlled feed of paper into the dewatering feed slurry tank 42 and the paper to fiber tank with high shear mixer 45. The duplex rotary feeders may be of the electric driven, variable operating speed type.

The dewatering feed slurry tank 42 may be of the rectangular closed top design and be located between the pulverized coal storage tank 38 and the shredded paper waste material storage tank 39 and close enough to allow gravity flow of both coal and paper into the top of the tank 42. The dewatering feed slurry tank 42 would be placed at a vertical elevation sufficient to allow the placement of the dewatering feed slurry tank mixer 43 in the bottom section of the tank 42. In addition to receiving the gravity flow of both the coal and paper from their storage tanks 38 and 39, respectively, the dewatering feed slurry tank 42 would receive the following slurry flows from the separation and recycle systems of the treatment process: (1) the discharge from the top of the first stage pressurized air separation column 7, (2) the discharge from the top of the second stage pressurized air separation column 10, (3) the excess settled sludge from the sludge transfer supply tank 18, (4) the return of the spent media from the spent coal/paper re-slurry tank 27, and (5) the underflow from the concentration column for underflow of separation columns 48. The solid material fed to the slurry tank would be coal and paper. All of these feeds would be selected and controlled to provide for efficient operation of the dewatering device and adequate fuel feed to the furnace based on electric power demands.

As the treatment plant is operated at a constant rate of flow, changes in the input to the dewatering slurry tank 42 would be caused by a change in the composition of the wastewater entering the treatment plant. Except in the case of an accidental dumping of material into the collection system of the treatment plant, major changes in the composition of the wastewater entering the treatment plant would not occur as long as the control of dissolved oxygen in the collection and transmission systems is maintained. Changes in the composition of the wastewater caused by changes in sources in the collection system could be made without difficulty within the design basis of the energy recovery sludge free treatment system of the present invention as long as these changes were not of the rapid cyclic type.

Current methods of dewatering wastewater solids include the use of high degrees of centrifugal force and both high and low differential pressure for extraction of water from wastewater solids. All other currently used methods are inefficient, require high power costs and have low rates of production, thus requiring very high initial costs for equipment. In many cases, the wastewater solids are prepared for dewatering by the use of thermal systems which further increase the initial and operating costs of separation of the entrained water from the wastewater solids. The growth of either aerobic or anaerobic bacteria on the surface and within the interstructure of the wastewater solid greatly increases the retention of the liquid phase, thereby greatly increasing the problem of dewatering of the wastewater solids.

In conventional wastewater treatment systems, the rapid growth of bacteria on the wastewater solids is used as the primary method of treatment of the solids. These methods of treatment result in the production of a biomass with high concentrations of bacteria which even with the most extensive treatment still contains large amounts of water, many times the weight of the solids in the biomass.

By control of the dissolved oxygen concentrations in the wastewater collection, transmission and treatment systems, according to the present invention, it is possible to completely eliminate the growth of anaerobic bacteria and to minimize the growth of aerobic bacteria. With low concentrations of bacteria in the separated wastewater solids, high efficiency dewatering is possible by the addition of waste paper and coal by simply mixing the paper and coal with the wastewater solids and using a low energy differential pressure system such as a belt press which provides high production rates coupled with low initial costs.

A dewatering feed slurry tank mixer 43 is provided and may be of the mechanical electric driven gear reduced type with a horizontal rotating shaft with an agitation element that would be suitable for full suspension and uniformity of a high density solids slurry.

A dewatering feed screw conveyor 44 may be located directly under and would receive the discharge from the dewatering feed slurry tank mixer 43. The dewatering feed screw conveyor 44 would be driven by an electric motor through a gear reduced variable speed drive to provide the needed variable feed rate to the continuous differential pressure dewatering device 51. Conveyor systems suitable for transfer of high density slurry other than a screw conveyor can be used for this application.

A paper to fiber tank with high shear mixer 45 may be of the open top vertical type and would receive a supply of internal reuse effluent from the water reuse supply centrifugal pump system 26 and its feed of shredder paper directly from the shredded paper waste material storage tank 39. The high shear mixer can be used to prepare a supply of paper fiber slurry for use by both the fiber slurry transfer pump 67 and the coal and paper fiber slurry tank with mixer 46. The paper fiber slurry prepared in the paper to fiber tank with high shear mixer 45 would be fed by gravity into the coal and paper fiber slurry tank with mixer 46 where the addition of coal would complete the preparation of the mixed media for the effluent contact columns 22. A single split tank design could be used to combine the operation of both the paper to fiber tank with high shear mixer 45 and the coal and paper fiber slurry with mixer 46 into a single unit with the high shear mixer affecting only one-half of the tank contents and the second slurry suspension mixer affecting the second one-half of the tank contents for suspension of the coal and fiber mixed media for the contact columns 22. The reduction of the shredded paper waste material would be on a continuous preparation basis as a continuous supply of the paper fiber is required for the addition to the pipeline prior to the first stage air dispersion column 5. The amount of fiber necessary for the efficient operation of the first stage pressurized air separation column 7 and the second stage pressurized air separation column 10 is dependent on the concentration of wastewater solids, the capacity of the plant, the amount of bacterial development on the surface of the solids and the needed efficiency of removal of the wastewater solids by the pressurized air flotation stage of the process. The fiber requirements, depending on conditions, could be as little as 10% by weight of the solids removed to as much as an equal weight of fiber for weight of the solids removed in the pressurized air flotation stage of the process. The fiber slurry transfer pump 67 would provide the controlled addition of the fiber slurry to the pipeline injection point located near the first stage air dispersion column 5.

The coal and paper fiber slurry tank with mixer 46 could be either an individual vertical open top tank or a split tank with one side of the tank used for the paper to fiber tank with high shear mixer 45, and the other side for the coal and paper fiber tank with mixer 46. As the paper to fiber tank with high shear mixer 45 must be operated on a continuous basis, the slurry level in the tank would be maintained at a high constant level. This requirement allows for the gravity flow of the prepared fiber slurry for the paper to fiber tank with high shear mixer 45 into the coal and paper fiber slurry tank with mixer 46 by gravity. As the operation of the coal and paper fiber slurry tank with mixer 46 is only required when the replacement of the media is needed in one of the contact columns 22, on the average it would only be used one to three times in a twenty-four hour plant operating cycle. The coal and paper fiber slurry tank with mixer 46 would be supplied with two additions other than the fiber slurry from the paper to fiber tank with high shear mixer 45. The addition of coal needed for the mixed media would be directly from the pulverized coal storage tank 38. The effluent required for the slurry preparation would be supplied by the internal effluent reuse system 26. The mixed media would be transferred by the centrifugal slurry pump 47 to the contact column 22.

The centrifugal slurry pump 47 for transfer of the coal and paper fiber slurry would obtain its suction from the coal and paper fiber slurry tank with mixer 46. The centrifugal slurry pump for transfer of coal and paper fiber slurry 47 would transfer the slurry through a pipeline system with automatic control valves located at each of the effluent contact columns 22 in order to load the media into the column. When the needed amount of media slurry has been transferred from the coal and paper fiber slurry tank with mixer 46 to the contact columns 22, reuse water would be added to the tank and, in turn, to the suction of the centrifugal slurry pump 47 for transfer of coal and paper fiber slurry in order to flush the pipeline system and prevent plugging of the system with media solids.

Figure 7:
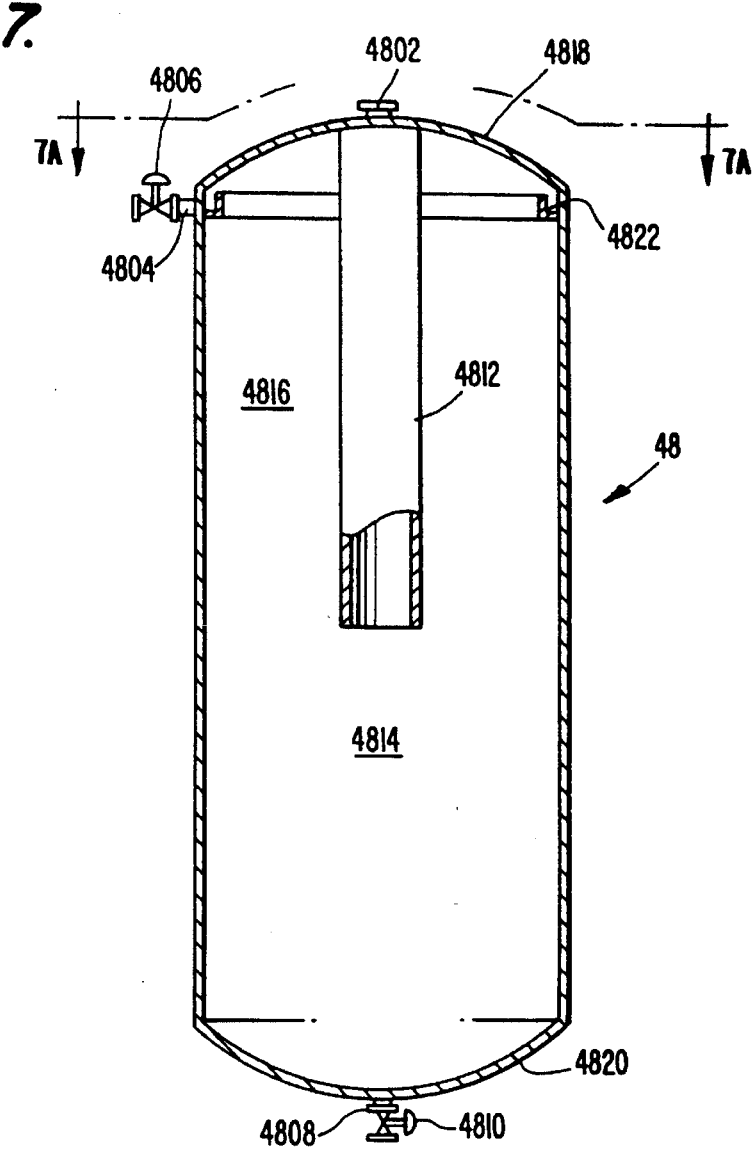
FIG. 7 is a side cross-sectional view of a concentration column which may be used in the present invention.
Figure 7A:
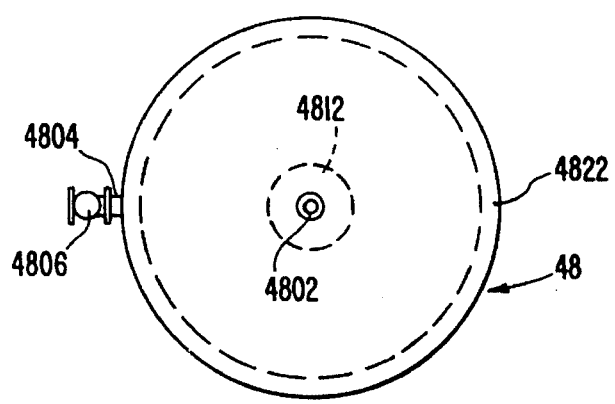
FIG. 7A is a plan view of the concentration column of FIG. 7 along line 7A—7A.

A concentration column 48 for underflow of separation columns is a vertical pressurized tank having (as shown in FIGS. 7 and 7A) an inlet 4802 located in the top head 4818 and an inlet directional flow circular baffle 4812 which directs the flow downward in the center section of the column to provide directional settling of the high density solids. From the inlet directional flow circular baffle 4812, the flow enters the settling zone 4814 with the solids concentrated in the center of the bottom head 4820. The water phase flows upward through the raise zone 4816 and is collected by the outlet collection weir 4822 and, in turn, is discharged through the outlet 4804 to the constant rate feed and dissolved oxygen control tanks 2 by way of the control valve 4806. The high density solid slurry is removed through the settled solids slurry discharge 4808 by way of the control valve 4810 using the internal pressure of the column and fed into the dewatering feed slurry tank 42.

Since compressed air is not used for biological oxidation of wastewater solids, but only for dissolved oxygen control, media suspension, operation of control valves and supply to air dispersers, only a small amount is required when compared to other processes. As the air pressure required in most systems will exceed 25 psi, a centrifugal compressor and air storage tank system is utilized for overall plant air supply.

Referring back to FIG. 1, a compressed air storage tank 49 may be provided as a closed pressurized tank of either the vertical or horizontal type. The size and operating pressure would be determined by the air requirements of the plant based on its capacity. The use of the air storage provides for efficient operation due to the variable times, rates and pressures required in the process of the present invention.

A centrifugal air compressor 50 may provide the supply of compressed air to the compressed air storage tank 49. The use of the centrifugal air compressor type unit 50 provides the column and pressure required for the operation of all of the air demand systems which have widely varying air pressure requirements.

A continuous differential pressure dewatering device 51 receives its feed of high density slurry from the dewatering feed slurry tank 42 by way of the dewatering feed screw conveyor 44. A belt press or similar type of unit would be the normal selection of the equipment used to remove the excess water from the slurry of coal, paper and wastewater solids.

The dewatering unit could use either pressure or vacuum as the source of the required differential pressure. The dewatered solids would be discharged from the continuous differential dewatering device into either a fluidized bed or a travelling grate furnace 53 and the excess water could be transferred by a centrifugal pump 52 to the constant rate feed and dissolved oxygen control tanks 2.

A travelling grate 53 or fluid bed furnace would be the normal selection for the combustion of the coal, paper and wastewater solids discharged from the continuous differential pressure dewatering device 51. The sizing of the travelling grate 53 or fluid bed furnace would be dependent on the capacity and concentration of solids in the wastewater as a minimum, but larger size units could be used based on the market for excess electrical power and the cost and availability of waste paper and coal.

Because the system operates at constant low rates, the electrical requirements of plant operation are almost constant during a 24-hour operating cycle which, in turn, would allow the storage of high density slurry for use as fuel for peak operation of the furnace and boiler systems to supply excess electric power to utilities for assisting in the supply of electrical power during their peak load cycle.

A factory-built, package-type boiler 54 matched to the size of either a fluidized bed or a travelling grate furnace 53 would be used in small and average size plants for the conversion of the combustion energy produced by the travelling grate 53 or fluid bed furnace into steam for operation of the steam turbine 30. Large size treatment plants may require field erected size boiler units 54. For very large plants, efficient increasing devices such as an air preheater may be added to the system.

The ash generated by the travelling grate 53 or fluid bed furnace may be discharged into a vertical top slurry tank 55 and mixed with internal reuse effluent from the internal effluent reuse supply centrifugal pump system 26, the underflow from the wet scrubber system 63 and the decant pump 59 returned from the ash storage and decant tank 58.

The ash slurry tank 55 may be equipped with an electrically driven mechanical mixer 56 of suitable size to provide full suspension of the solids in the water phase.

An ash slurry transfer pump 57 may take its suction from the ash slurry tank 55 and transfer the slurry through a pipeline system to the ash storage and decant tank 58 on a continuous basis.

The ash storage and decant tank 58 may be a vertical elevated open top tank with a cone-shaped bottom for settling and storage of the solids removed from the slurry transferred from the ash slurry tank 55. The elevation of the tank 55 would be determined by the method used for ash disposal.

A decant pump 59 may remove the excess water from the ash storage and decant tank 58 and transfer it to the ash slurry tank 55. The ash from the storage tank 58 may be removed by gravity flow into a track or rail car for land fill disposal.

A package-type, factory-built de-aerating feed water heater 60 of suitable size for the boiler 54 may be used to store and heat the boiler feed water returned from the condenser 32 and additional treated water from the boiler water treatment demineralizer system 62. The steam requirements for the de-aerating feed water heater 60 may be supplied from the exhaust of the steam turbine 30.

A boiler feed pump 61 may take its suction from the de-aerating feed water heater 60 and inject it into the boiler 54.

The boiler water treatment demineralizer system 62 may be a factory-built unit of suitable production capacity for the size of the boiler 54 and may be supplied with potable water for treatment to meet the quality standards of the boiler 54.

A factory-built, package-type wet scrubber system 63 may be used for emission control of the exhaust of the travelling grate furnace 53 using water supplied by the water reuse supply centrifugal pump system 26. The underflow of the wet scrubber system 63 would be discharged by gravity into the ash slurry tank 56.

A centrifugal exhaust fan 64 may be used for air flow through the travelling grate furnace 53 if used. For the use of a fluid bed furnace, the centrifugal fan 64 would be used for fuel suspension. A wet scrubber system 63 and the discharge stack 65 can be provided for either furnace system.

An exhaust discharge stack 65 of suitable size and height may be used for discharge of the air flow from the centrifugal exhaust fan 64.

An air preheater 66 may be used to transfer the thermal energy of the furnace exhaust to the incoming air fed to the furnace combustion chamber.

A fiber slurry transfer pump 67 may be used for the supply of fiber slurry from the paper to fiber tank with high shear mixer 45 to the pipeline injection point located just prior to the inlet of the first stage air dispersion column 5.

While I have shown and described several embodiments in accordance with the present invention, it is understood that the same is not limited thereto, but is susceptible to numerous changes and modifications as known to a person having ordinary skill in the art, and I therefor do not wish to be limited to the details shown and described herein, but intend to cover all such modifications as are encompassed by the scope of the appended claims.

I claim:

1. An apparatus for treating wastewater flowing through said apparatus, said wastewater containing insoluble solid waste material and soluble solid waste material, comprising:

means for collecting and transmitting said wastewater;

oxygenator means for controlling the oxygen content of said wastewater in said means for collecting and transmitting to a level at which growth of anaerobic bacteria is substantially eliminated;

separating means for separating said insoluble solid waste material from said wastewater, said separating means being downstream of and operably connected to said means for collecting and transmitting;

treatment means for treating said soluble solid material in said wastewater with a predetermined amount of aerobic bacteria, said treatment means being downstream of and operably connected to said separating means, and being downstream of said means for collecting and transmitting; and bacteria reduction means for reducing the amount of aerobic bacteria in said wastewater, said bacteria reduction means being downstream of and operably connected to said treatment means.

2. An apparatus according to claim 1, further comprising at least one contact column through which said wastewater may flow operably connected to said treatment means, said at least one contact column including means for charging said column with a coal and paper fiber medium and means for discharging said coal and paper fiber medium from said column, said at least one contact column being downstream of said treatment means.

3. An apparatus according to claim 1, further comprising means for burning the insoluble solid waste material separated from said wastewater.

4. An apparatus according to claim 1, wherein said insoluble solid waste material has a plurality of different densities and wherein said separating means comprises:

a hollow, substantially vertical column through which said wastewater may flow;

an inlet for said wastewater positioned at a lower section of said column;

means for disbursing a gas in the wastewater entering said column;

means for adding paper fiber to the wastewater entering said column; and means for controlling the upward rise of the wastewater containing said gas disbursed therein and said paper fiber through said column;

whereby insoluble solid waste material having a higher density is collected at a lower portion of said column and separate from liquid material of said wastewater, and insoluble solid waste material having a lower density attaches to rising gas bubbles and is collected at an upper portion of said column separated from said liquid material.

5. An apparatus according to claim 1, wherein said treatment means includes oxygenator means for controlling the oxygen content of wastewater in said treatment means.

6. An apparatus according to claim 1, further comprising at least one storage tank downstream of said means for collecting and transmitting and upstream of said separating means, said at least one storage tank including oxygenator means for controlling the oxygen content of wastewater in said at least one storage tank to a level at which growth of anaerobic bacteria is substantially eliminated and growth of aerobic bacteria is minimized.

7. An apparatus according to claim 6, wherein said oxygenator means of said at least one storage tank controls the level of dissolved oxygen in wastewater within said at least one storage tank to a range between about 0.5 and 1.0 parts per million.

8. An apparatus for separating solid material having a plurality of different densities from a mixture containing liquid material and said solid materials, comprising:

a hollow, substantially vertical column through which said mixture may flow;

an inlet for said mixture positioned at a lower section of said column;

means for disbursing a gas in said liquid material entering said column;

means for adding paper fiber to said mixture entering said column; and means for controlling the rate of upward flow of said mixture containing said gas disbursed therein and said paper fiber through said column;

whereby solid material having a higher density is collected at a lower portion of said column and separate from said liquid material and solid material having a lower density attaches to rising gas bubbles and is collected at an upper portion of said column separated from said liquid material.

9. An apparatus according to claim 8, wherein said means for controlling the rate of upward flow of said mixture comprises means for maintaining a positive gas pressure above a surface of said mixture in said column.

* * * * *